(12) United States Patent
Lambert

(10) Patent No.: US 11,225,915 B2
(45) Date of Patent: Jan. 18, 2022

(54) ENGINE CORE SPEED REDUCING METHOD AND SYSTEM

(71) Applicant: General Electric Company, Schenectady, NY (US)

(72) Inventor: Robert William Lambert, West Chester, OH (US)

(73) Assignee: General Electric Company, Schenectady, NY (US)

( * ) Notice: Subject to any disclaimer, the term of this patent is extended or adjusted under 35 U.S.C. 154(b) by 805 days.

(21) Appl. No.: 15/814,743

(22) Filed: Nov. 16, 2017

(65) Prior Publication Data

US 2019/0145323 A1   May 16, 2019

(51) Int. Cl.
| | |
|---|---|
| *F02C 9/28* | (2006.01) |
| *F02C 9/16* | (2006.01) |
| *F01D 11/14* | (2006.01) |
| *F02C 9/30* | (2006.01) |
| *F02C 9/34* | (2006.01) |
| *F02C 9/36* | (2006.01) |
| *F02C 9/38* | (2006.01) |
| *G05B 23/02* | (2006.01) |

(52) U.S. Cl.
CPC .............. *F02C 9/28* (2013.01); *F01D 11/14* (2013.01); *F02C 9/16* (2013.01); *F02C 9/30* (2013.01); *F02C 9/34* (2013.01); *F02C 9/36* (2013.01); *F02C 9/38* (2013.01); *F05D 2270/02* (2013.01); *F05D 2270/301* (2013.01); *F05D 2270/303* (2013.01); *F05D 2270/304* (2013.01); *G05B 23/0232* (2013.01)

(58) Field of Classification Search
None
See application file for complete search history.

(56) References Cited

U.S. PATENT DOCUMENTS

| | | | |
|---|---|---|---|
| 4,329,114 | A | 5/1982 | Johnston |
| 5,107,674 | A | 4/1992 | Wibbelsman |
| 5,174,105 | A | 12/1992 | Hines |
| 6,470,258 | B1 | 10/2002 | Leamy |
| 7,506,517 | B2 | 3/2009 | Uluyol |
| 7,679,529 | B2 | 3/2010 | Clark |
| 8,056,344 | B2 | 11/2011 | Remy |
| 9,464,573 | B2 | 10/2016 | Remy |
| 2016/0265380 | A1* | 9/2016 | Davis ............... F01D 11/22 |
| 2016/0326901 | A1* | 11/2016 | Rowe ............... F01D 21/12 |
| 2017/0284307 | A1* | 10/2017 | Inoue ............... F02C 3/04 |
| 2018/0223684 | A1* | 8/2018 | Arnold ............. F01D 11/24 |

* cited by examiner

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A method for reducing an engine core speed is disclosed, which includes determining a condition of an engine during operation of the engine, and controlling an engine turbine clearance based on the condition of the engine so as to influence the engine core speed. An engine system comprising an engine core speed reducing system is also disclosed.

12 Claims, 5 Drawing Sheets

ENGINE CORE SPEED REDUCING METHOD AND SYSTEM

BACKGROUND

This disclosure relates generally to the field of engines, and more particularly to an engine core speed reducing method and system.

During takeoff of an engine, an engine core speed needs to be controlled within a maximum allowable threshold. A low engine core speed margin between the engine core speed and the maximum allowable threshold typically manifests into a thrust shortfall, especially on hot days. Typically, the engine core speed is reduced by opening variable stator vanes (VSV), however, opening VSV reduces compressor stall margin which makes opening the VSV to control the engine core speed and undesirable option during takeoff.

Therefore, in view of the foregoing, a method for reducing the engine core speed during takeoff is particularly valuable.

BRIEF DESCRIPTION

In one aspect of embodiments of the present disclosure, an engine core speed reducing method is provided. The engine core speed reducing method comprises determining a condition of the engine during operation of the engine, and controlling an engine turbine clearance based on the condition of the engine so as to influence the engine core speed.

In another aspect of embodiments of the present disclosure, an engine system is provided. The engine system comprises a turbine section comprising a high pressure turbine and a low pressure turbine; sensors mounted on the engine; and a full authority digital engine control comprising a high pressure turbine active clearance control. The high pressure turbine active clearance control comprises an engine core speed reducing system, and the engine core speed reducing system comprises a processor configured to determine the condition of the engine during operation of the engine based on data from the sensors, and a controller configured to control an engine turbine clearance based on the condition of the engine so as to influence the engine core speed.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings.

In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. In addition, Terms indicating specific locations, such as "top", "bottom", "left", and "right", are descriptions with reference to specific accompanying drawings. Embodiments disclosed in the present disclosure may be placed in a manner different from that shown in the figures. Therefore, the location terms used herein should not be limited to locations described in specific embodiments.

Figure 1:
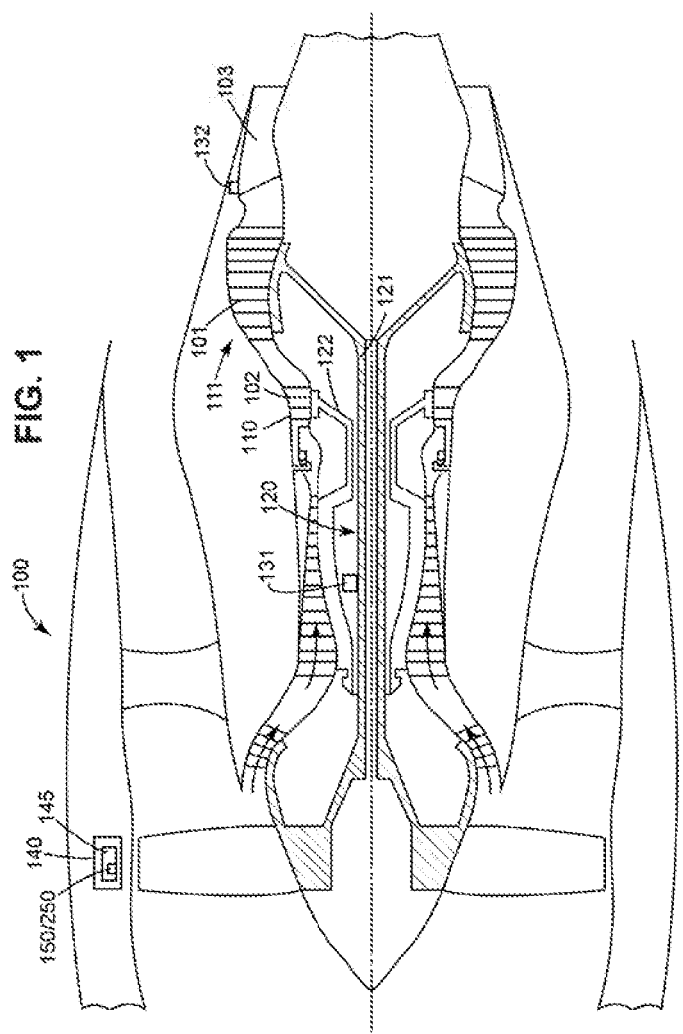
FIG. 1 is a schematic diagram of an exemplary engine system.

FIG. 1 illustrates a schematic diagram of an engine system 100. As shown in FIG. 1, the engine system 100 comprises a turbine section 111 which comprises a low pressure turbine 101 and a high pressure turbine 102. The engine system 100 comprises at least one rotating member 120 including a low pressure shaft 121 and a high pressure shaft 122. The engine system 100 comprises a plurality of sensors including but not limited to at least one speed sensor 131 and at least one temperature sensor 132. In one embodiment, the speed sensor 131 is mounted near the high pressure shaft 122 to detect an engine core speed $N_2$, and the temperature sensor 132 is mounted near an exhaust nozzle 103 of the turbine section 111 to detect an exhaust gas temperature T. The engine system 100 comprises a full authority digital engine control (FADEC) 140 and the FADEC 140 comprises a high pressure turbine active clearance control (HPTACC) 145. The HPTACC 145 comprises an engine core speed reducing system 150/250. The engine core speed reducing system 150/250 can determine a condition of the engine system 100, wherein the condition comprises at least one of a condition of the engine core speed $N_2$ and a condition of temperatures, and when the engine system 100 is determined to be in different conditions, the engine core speed reducing system 150/250 can control the engine core speed $N_2$ correspondingly. The engine core speed reducing system 150/250 can influence the engine core speed $N_2$ by control an engine turbine clearance 110, wherein the engine turbine clearance 110 is a clearance between engine turbine rotor blades and shrouds at an outer case. In one embodiment, when the engine core speed $N_2$ needs to be reduced, the engine core speed reducing system 150/250 can control the engine turbine clearance 110 opening, then the engine core speed $N_2$ is reduced.

Figure 2:
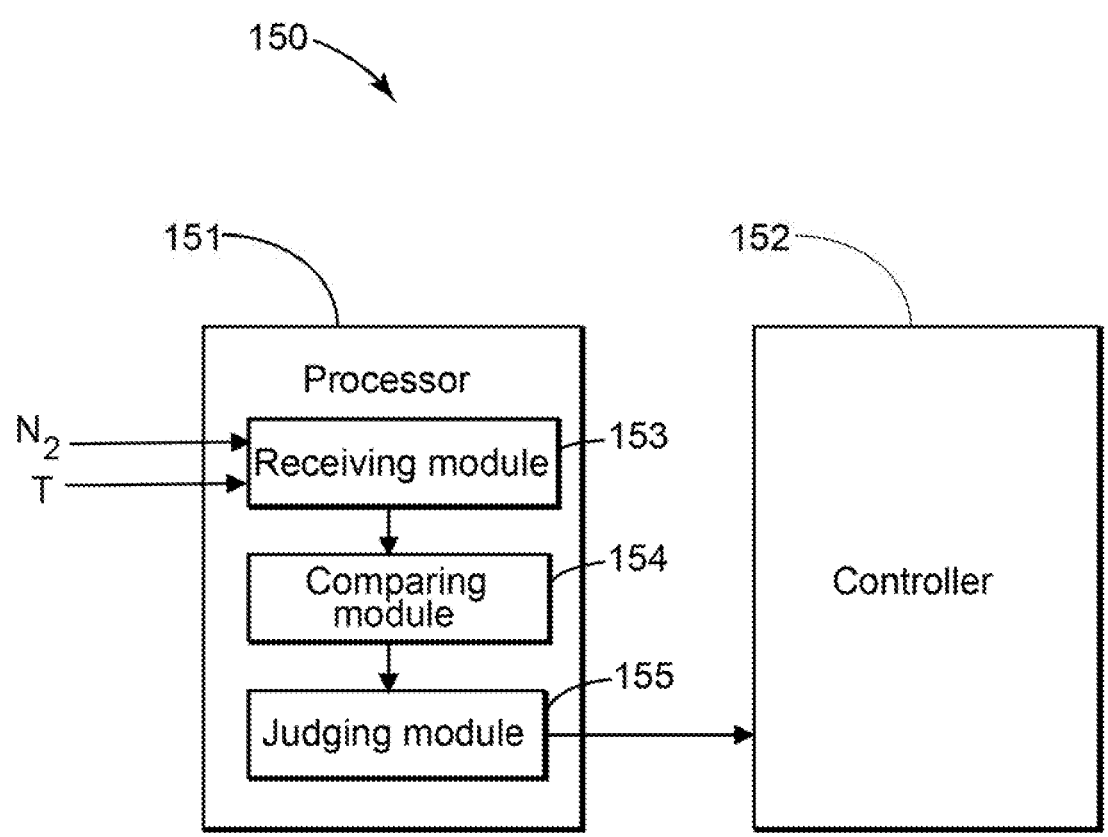
FIG. 2 is a schematic diagram of an engine core speed reducing system in accordance with a first embodiment of the present disclosure.

FIG. 2 illustrates the engine core speed reducing system 150 in accordance with a first embodiment of the present disclosure. As shown in FIG. 2, the engine core speed reducing system 150 comprises a processor 151 for determining a condition of the engine during operation of the engine, and a controller 152 for controlling the engine turbine clearance 110 based on the condition of the engine so as to influence the engine core speed $N_2$. The processor 151 comprises a receiving module 153, a comparing module 154 and a judging module 155. The receiving module 153 may receive engine parameters from the sensors. The engine parameters comprise the engine core speed $N_2$ and the exhaust gas temperature T. In one embodiment, the receiving module 153 can also receive aircraft parameters from sensors mounted on an aircraft, and the aircraft parameters may comprise for example an air speed, an air temperature, an altitude, and the like. The comparing module 154 may compare the engine core speed $N_2$ and the exhaust gas temperature T with predetermined thresholds. The judging module 155 may obtain the condition of the engine based on compared results. The controller 152 may send a bias amount of the engine turbine clearance 110 to the HPTACC 145 to bias open the engine turbine clearance 110, wherein the bias amount is an amount of the engine turbine clearance and the engine turbine clearance 1110 comprises a high pressure turbine clearance. When the engine turbine clearance 110 is controlled to bias open, an efficiency of engine turbines comprising the high pressure turbine 102 will be reduced so as to reduce the engine core speed $N_2$.

In one embodiment, during an operation of the engine core speed reducing system 150, when the exhaust gas temperature T is less than a temperature threshold $T_{max}$ and the engine core speed $N_2$ is larger than a first speed threshold $S_1$, the engine is determined to be in a first condition. In the first condition, the bias amount of the engine turbine clearance 110 is larger than zero. When the exhaust gas temperature T is less than the temperature threshold $T_{max}$ and the engine core speed $N_2$ is less than the first speed threshold $S_1$, the engine is determined to be in a second condition. In the second condition, the bias amount is equal to zero. When the exhaust gas temperature T is no less than the temperature threshold $T_{max}$, the engine is determined to be in a third condition. In the third condition, the bias amount is also equal to zero. Furthermore, when the engine is determined to be in the first condition, if the engine core speed $N_2$ is not larger than a second speed threshold $S_2$, wherein the second speed threshold $S_2$ is higher than the first speed threshold $S_1$, and the second speed threshold $S_2$ is less than a maximum allowable threshold of the engine core speed $S_{max}$, the bias amount is determined by the relationship among the engine core speed $N_2$, the first speed threshold $S_1$ and the second speed threshold $S_2$, more specifically, the bias amount is determined by a ratio of a difference between the engine core speed $N_2$ and the first speed threshold $S_1$ to a difference between the second speed threshold $S_2$ and the first speed threshold $S_1$, i.e. $(N_2-S_1)/(S_2-S_1)$; if the engine core speed $N_2$ is larger than the second speed threshold $S_2$, the bias amount is a maximum bias clearance, as shown in Table 1.

TABLE 1 detailed bias amount based on the compared results

| Compared results of T | Compared results of $N_2$ | Bias amount |
| --- | --- | --- |
| $T < T_{max}$ | $N_2 > S_2$ | a maximum |
| $T < T_{max}$ | $S_1 \leq N_2 \leq S_2$ | $(N_2 - S_1)/(S_2 - S_1)$ * the maximum |
| $T < T_{max}$ | $N_2 < S_1$ | 0 |
| $T \geq T_{max}$ | / | 0 |

In one embodiment, when the controller 152 sends the bias amount to the HPTACC 145, the HPTACC 145 will add the bias amount to a bias instruction generated by the HPTACC 145 to control the engine turbine clearance 110, specifically the high pressure turbine clearance, hence when the bias amount is equal to zero, the HPTACC 145 may independently control the engine turbine clearance 110. The engine core speed reducing system 150 can reduce the engine core speed $N_2$ by nearly 1% during takeoff by controlling the engine turbine clearance 110.

Figure 3:
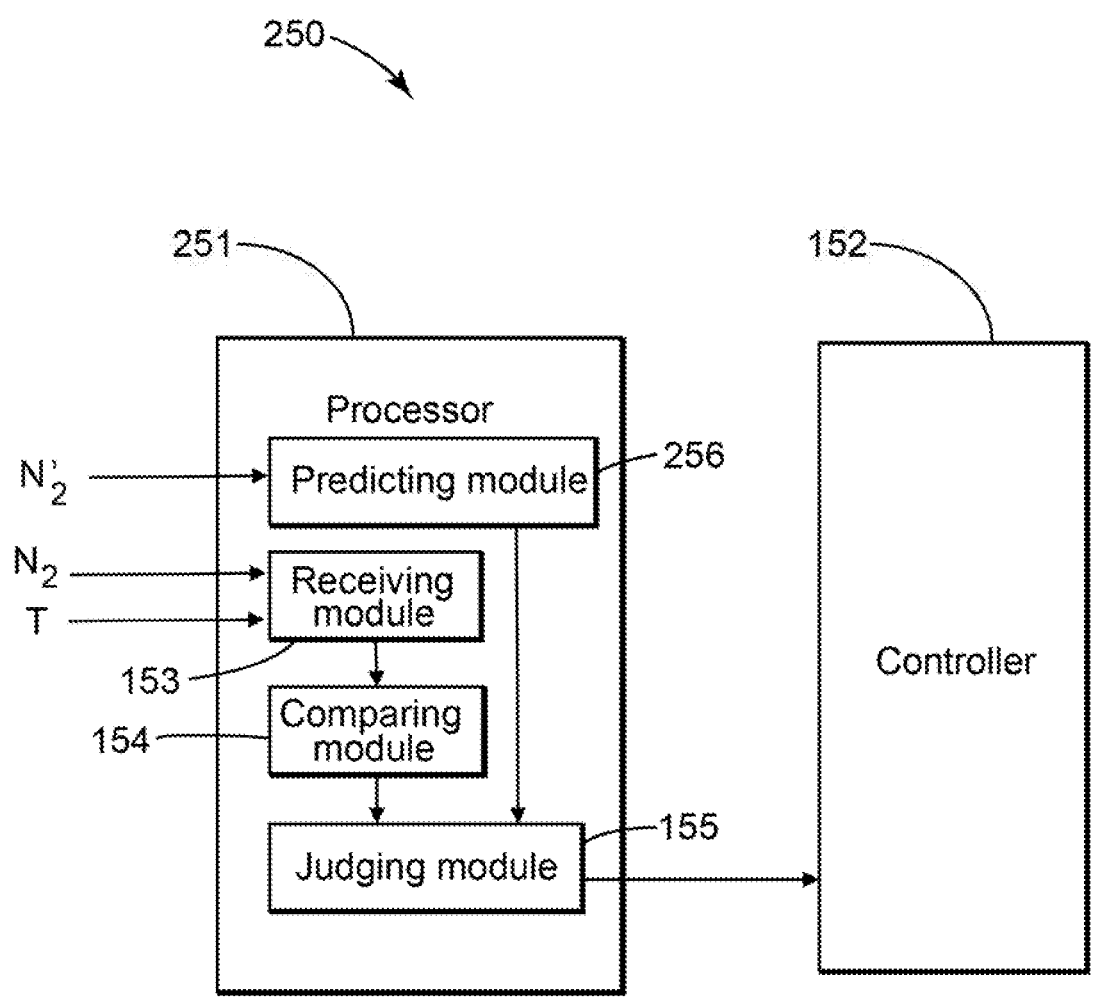
FIG. 3 is a schematic diagram of an engine core speed reducing system in accordance with a second embodiment of the present disclosure.

FIG. 3 illustrates the engine core speed reducing system 250 in accordance with a second embodiment of the present disclosure. As shown in FIG. 3, different from the first embodiment, in the basis of the engine core speed reducing system 150 of FIG. 2, the engine core speed reducing system 250 of the second embodiment may further comprise a predicting module 256. The predicting module 256 may predict an engine core speed trend according to historical engine core speed data $N_2'$ during startup and/or idling. The judging module 155 can obtain the condition of the engine based on the engine core speed trend and the controller 152 can control the engine turbine clearance based on the condition of the engine. In one embodiment, by monitoring and predicting the engine core speed trend, when the engine core speed trend is predicted to exceed the maximum allowable threshold $S_{max}$, so in this condition, the controller 152 may control the HPTACC 145 at idle to maximally open the engine turbine clearance so as to influence the engine core speed. In an optional embodiment, the engine turbine clearance may be maximally bias open by manual control. By monitoring and predicting the engine core speed trend, whether the engine will have a low engine core speed margin will be predicted, specifically on hot days. When the engine is predicted to have a risk of running out of the engine core speed margin, the engine can bias open the engine turbine clearance during startup and/or idling to pre-control the engine core speed, which is more effective.

Figure 4:
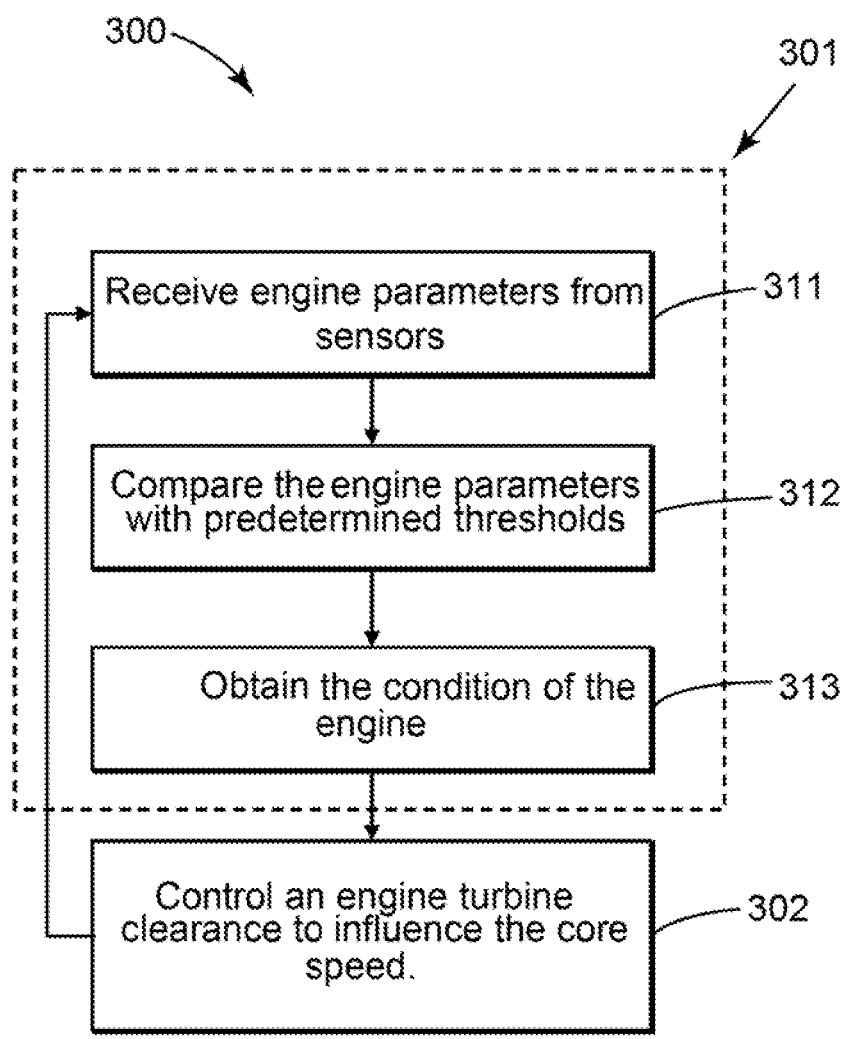
FIG. 4 is a flow chart of an engine core speed reducing method in accordance with the first embodiment of the present disclosure.

FIG. 4 illustrates a flow chart of an engine core speed reducing method 300 in accordance with a first embodiment of the present disclosure. The engine core speed reducing method 300 may include the steps as follows.

In step 301, a condition of an engine is determined during operation of the engine. In one embodiment, the step 301 may include the following steps:

In step 311, engine parameters from sensors are received. In one embodiment, the engine parameters comprise an engine core speed and an exhaust gas temperature.

In step 312, the engine parameters are compared with predetermined thresholds. In one embodiment, the predetermined thresholds may comprise a temperature threshold, a first speed threshold, and a second speed threshold. The first speed threshold is less than the second speed threshold and the second speed threshold is less than a maximum allowable threshold of the engine core speed.

In step 313, the condition of the engine is obtained based on compared results. In one embodiment, when the exhaust gas temperature is less than the temperature threshold and the engine core speed is larger than the first speed threshold, the engine is determined to be in a first condition; when the exhaust gas temperature is less than the temperature threshold and the engine core speed is less than the first speed threshold, the engine is determined to be in a second condition; when the exhaust gas temperature is no less than the temperature threshold, the engine is determined to be in a third condition. Furthermore, in the first condition, if the engine core speed is less than the second speed threshold, the engine is determined to be in a first-a condition, and if the engine core speed is larger than the second speed threshold, the engine is determined to be in a first-b condition. Then the process goes to step 302.

In step 302, an engine turbine clearance is controlled based on the condition of the engine so as to influence the engine core speed. In one embodiment, the engine turbine clearance, specifically, a high pressure turbine clearance, is controlled by sending a bias amount of the engine turbine clearance to a high pressure turbine active clearance control (HPTACC), and the HPTACC can bias open the engine turbine clearance to influence the engine core speed. When the engine is determined to be in the first condition, the bias amount is larger than zero, wherein if the engine is determined to be in the first-a condition, the bias amount is determined by the relationship among the engine core speed, the first speed threshold and the second speed threshold, if the engine is determined to be in the first-b condition, the bias amount is a maximum bias clearance; when the engine is determined to be in the second condition, the bias amount is equal to zero; when the engine is determined to be in the third condition, the bias amount is equal to zero.

Figure 5:
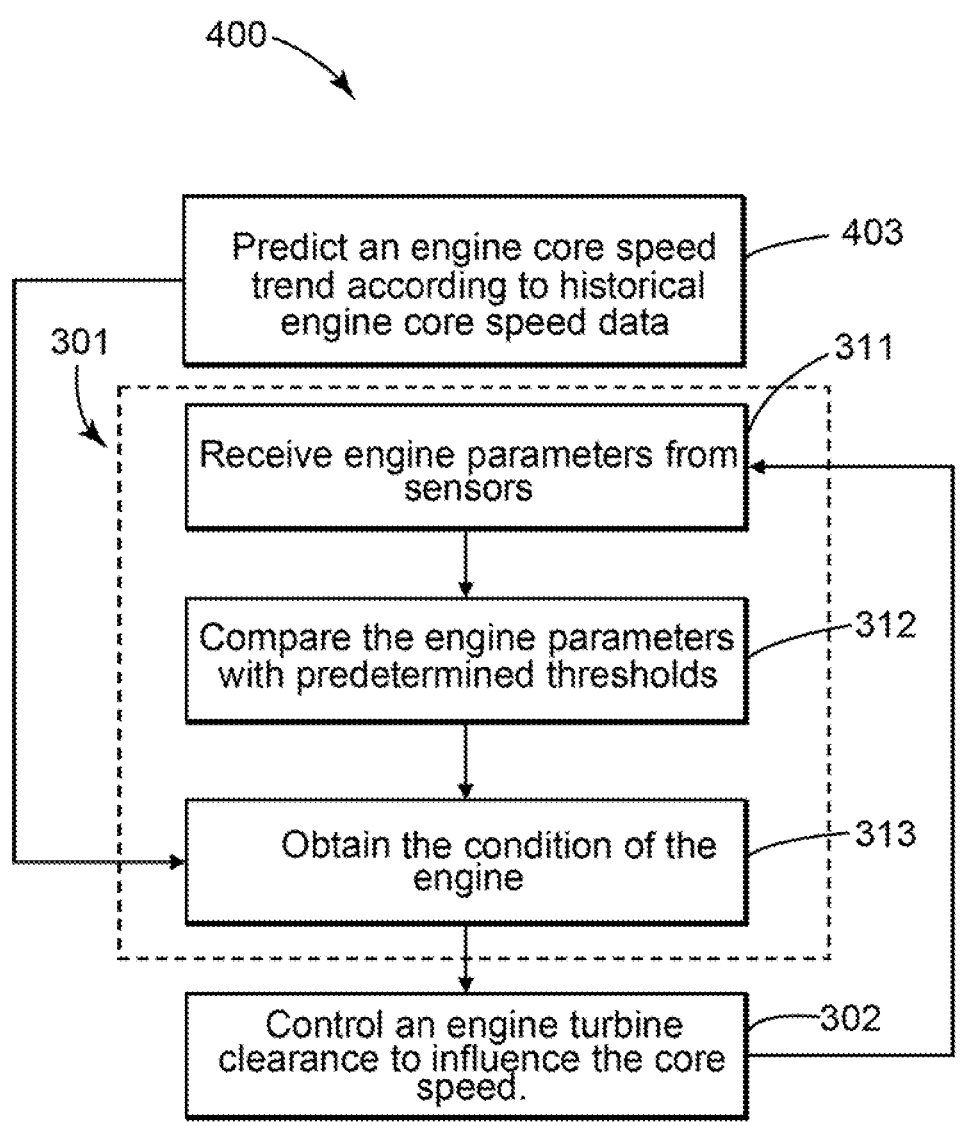
FIG. 5 is a flow chart of an engine core speed reducing method in accordance with the second embodiment of the present disclosure.

FIG. 5 illustrates a flow chart of an engine core speed reducing method 400 in accordance with the second embodiment of the present disclosure. As shown in FIG. 5, different from the first embodiment, in the basis of the engine core speed reducing method 300 of FIG. 4, the engine core speed reducing method 400 of the second embodiment may further comprise a step 403.

In step 403, an engine core speed trend is predicted according to historical engine core speed data during startup and/or idling. Then the process goes to step 313, the condition of the engine is obtained based on the engine core speed trend. In one embodiment, when the engine core speed trend is predicted to exceed a maximum allowable threshold of the engine core speed, the engine is determined to be in a fourth condition; when the engine core speed trend is predicted not to exceed the maximum allowable threshold, the engine is determined to be in a fifth condition. Then the process goes to step 302, an engine turbine clearance is controlled to influence the engine core speed. In one embodiment, when the engine is determined to be in the fourth condition, the engine turbine clearance, especially the high pressure turbine clearance, is controlled to maximally bias open by controlling the HPTACC at idle. In an optional embodiment, the engine turbine clearance is manually controlled to bias open. Then the process goes to step 311.

While steps of the engine core speed reducing method in accordance with embodiments of the present disclosure are illustrated as functional blocks, the order of the blocks and the separation of the steps among the various blocks shown in FIG. 4 and FIG. 5 are not intended to be limiting. For example, the blocks may be performed in a different order and a step associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. An engine system, comprising:
   at least one turbine;
   sensors mounted on the engine system; and
   a full authority digital engine control comprising a turbine active clearance control, wherein the turbine active clearance control comprises an engine core speed reducing system comprising:
      a processor configured to determine a condition of the engine system based on engine parameters from the sensors during operation of the engine system; and
      a controller configured to control an engine turbine clearance based on the condition of the engine system so as to influence an engine core speed,
   wherein the processor comprises:
      a receiving module for receiving the engine parameters from the sensors,
      a comparing module for comparing the engine parameters from the sensors with predetermined thresholds; and
      a judging module for obtaining a condition of the engine system based on compared results, wherein
         the controller is configured to send a bias amount of the engine turbine clearance to the turbine active clearance control to bias open the engine turbine clearance, wherein
         the bias amount is an amount of the engine turbine clearance, wherein, when an exhaust gas temperature is less than a predetermined temperature threshold and the engine core speed is larger than a predetermined first speed threshold, the engine system is determined to be in a first condition, and wherein:
            if the engine core speed is not larger than a predetermined higher second speed threshold, the bias amount of the engine turbine clearance is determined by a maximum bias clearance multiplied by a ratio of a difference between the engine core speed and the predetermined first speed threshold and a difference between the predetermined second speed threshold and the predetermined first speed threshold; and
            alternatively, if the engine core speed is larger than the predetermined second speed threshold, the bias amount is the maximum bias clearance.

2. The engine system according to claim 1, wherein the engine parameters from the sensors comprise at least one of the engine core speed and the exhaust gas temperature.

3. The engine system according to claim 1, wherein: when the exhaust gas temperature is less than the predetermined temperature threshold and the engine core speed is less than the predetermined first speed threshold, the engine system is determined to be in a second condition, and the bias amount of the engine turbine clearance is equal to zero; and alternatively, when the exhaust gas temperature is no less than the predetermined temperature threshold, the engine system is determined to be in a third condition, and the bias amount of the engine turbine clearance is equal to zero.

4. The engine system according to claim 1, wherein the processor further comprises:
   a predicting module for predicting an engine core speed trend according to historical engine core speed data, wherein the judging module is configured to obtain the condition of the engine based on the engine core speed trend.

5. The engine system according to claim 4, wherein when the engine core speed trend is predicted to exceed a maximum speed threshold, the engine system is determined to be in a fourth condition, and the controller is configured to control the turbine active clearance control at idle to bias open the engine turbine clearance to the maximum bias clearance.

6. The engine system according to claim 1, wherein the at least one turbine is a high pressure turbine.

7. The engine system according to claim 5, wherein the controller is configured to control the turbine active clearance control at idle to bias open the engine turbine clearance to the maximum bias clearance, based on receipt of a manual command.

8. A digital engine control system for controlling a turbine engine system, comprising:
   an engine core speed reducing system comprising:
      a processor configured to receive sensed engine parameters indicative of operation of the engine system and to determine a condition of the engine system based on the engine parameters, the processor comprising:
         a receiving module for receiving the sensed engine parameters;
         a comparing module for comparing the sensed engine parameters with predetermined thresholds; and
         a judging module for obtaining the condition of the engine system based on compared results; and a controller configured to influence an engine core speed by controlling an engine turbine clearance based on the condition of the engine system,
      wherein the controller is configured to send a bias amount of the engine turbine clearance to a turbine active clearance control to bias open the engine turbine clearance, wherein
         the bias amount is an amount of the engine turbine clearance, wherein, when an exhaust gas temperature is less than a predetermined temperature threshold and the engine core speed is larger than a predetermined first speed threshold, the engine system is determined to be in a first condition, and wherein:
            if the engine core speed is not larger than a predetermined higher second speed threshold, the bias amount of the engine turbine clearance is determined by a maximum bias clearance multiplied by a ratio of a difference between the engine core speed and the predetermined first speed threshold and a difference between the predetermined second speed threshold and the predetermined first speed threshold; and
            alternatively, if the engine core speed is larger than the predetermined second speed threshold, the bias amount is the maximum bias clearance.

9. The digital engine control system according to claim 8, wherein the engine parameters from the sensors comprise at least one of the engine core speed and the exhaust gas temperature.

10. The digital engine control system according to claim 8, wherein the controller is configured control the engine turbine clearance by determining the bias amount to bias open the engine turbine clearance.

11. The digital engine control system according to claim 10, wherein the controller is further configured to generate a bias instruction that, when executed, causes the turbine active clearance control system to bias open the engine turbine clearance according to the bias amount.

12. The digital engine control system according to claim 10, wherein the controller is further configured to:
   communicate the bias amount; and
   in response to receiving a manual control, to bias open the engine turbine clearance.

\* \* \* \* \*